(12) United States Patent
Okazaki et al.

(10) Patent No.: US 7,443,127 B2
(45) Date of Patent: Oct. 28, 2008

(54) APPARATUS AND METHOD FOR MOTOR CONTROL USING TABLE

(75) Inventors: Yoshimi Okazaki, Kanagawa-ken (JP); Keisuke Okuda, Kanagawa-ken (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 0 days.

(21) Appl. No.: 11/350,869

(22) Filed: Feb. 10, 2006

(65) Prior Publication Data

US 2006/0192510 A1 Aug. 31, 2006

(30) Foreign Application Priority Data

Feb. 25, 2005 (JP) ............................. 2005-050712

(51) Int. Cl.
*H02P 27/04* (2006.01)
(52) U.S. Cl. ....................... 318/722; 318/139; 318/799; 318/800; 318/807
(58) Field of Classification Search ................. 318/139, 318/432, 433, 439, 721, 712–715, 716, 700, 318/701, 802, 400.01, 722, 799, 800, 807
See application file for complete search history.

(56) References Cited

U.S. PATENT DOCUMENTS

| | | | | |
|---|---|---|---|---|
| 4,456,868 A * | 6/1984 | Yamamura et al. | ........... | 318/800 |
| 4,500,819 A * | 2/1985 | Trusock et al. | ............... | 318/106 |
| 5,194,794 A * | 3/1993 | Shamoto | ...................... | 318/603 |
| 5,420,492 A * | 5/1995 | Sood et al. | ................... | 318/809 |
| 5,481,168 A * | 1/1996 | Mutoh et al. | ................. | 318/432 |
| 5,583,593 A * | 12/1996 | Terada | ......................... | 396/435 |
| 5,652,495 A * | 7/1997 | Narazaki et al. | ............ | 318/716 |
| 5,739,650 A * | 4/1998 | Kimura et al. | ......... | 318/400.07 |
| 5,920,161 A * | 7/1999 | Obara et al. | ................. | 318/139 |
| 6,037,741 A * | 3/2000 | Yamada et al. | .............. | 318/721 |
| 6,194,865 B1 * | 2/2001 | Mitsui et al. | ................. | 318/811 |
| 6,281,656 B1 * | 8/2001 | Masaki et al. | ............... | 318/700 |
| 6,329,781 B1 * | 12/2001 | Matsui et al. | ............... | 318/717 |
| 6,362,586 B1 * | 3/2002 | Naidu | ......................... | 318/432 |
| 6,396,229 B1 * | 5/2002 | Sakamoto et al. | ...... | 318/400.02 |
| 6,501,243 B1 * | 12/2002 | Kaneko et al. | .............. | 318/700 |
| 6,674,262 B2 * | 1/2004 | Kitajima et al. | ............. | 318/722 |
| 6,700,400 B2 * | 3/2004 | Atarashi | ...................... | 324/772 |
| 6,777,897 B2 * | 8/2004 | Murai | ......................... | 318/138 |
| 7,034,483 B2 * | 4/2006 | Takahashi et al. | ........... | 318/432 |
| 2003/0030404 A1 * | 2/2003 | Iwaji et al. | ................... | 318/700 |
| 2004/0207364 A1 * | 10/2004 | Uguzzoni et al. | ........... | 320/128 |
| 2004/0232865 A1 * | 11/2004 | Suzuki | ....................... | 318/439 |
| 2005/0140329 A1 * | 6/2005 | Ihm | ............................ | 318/712 |

FOREIGN PATENT DOCUMENTS

JP 6-296387 A 10/1994

* cited by examiner

*Primary Examiner*—Rita Leykin
(74) *Attorney, Agent, or Firm*—Birch, Stewart, Kolasch & Birch, LLP

(57) ABSTRACT

In an apparatus of controlling a motor in a battery vehicle, a current command generation section has a table, and generates an exciting command current and a torque command current by referring to the table based on a torque command. A converting section generates 3-phase command voltages from the exciting command current and the torque command current. A motor driving section drives a motor in response to the 3-phase command voltages.

15 Claims, 5 Drawing Sheets

Fig. 2A

| | ROTATION FREQUENCY $N_1$ | ROTATION FREQUENCY $N_2$ | -------- |
|---|---|---|---|
| TORQUE $T_1$ | $Iq_{11}$ | $Iq_{21}$ | -------- |
| TORQUE $T_2$ | $Iq_{12}$ | $Iq_{22}$ | -------- |
| ⋮ | ⋮ | ⋮ | ⋮ |

Fig. 2B

| | ROTATION FREQUENCY $N_1$ | ROTATION FREQUENCY $N_2$ | -------- |
|---|---|---|---|
| TORQUE $T_1$ | $Id_{11}$ | $Id_{21}$ | -------- |
| TORQUE $T_2$ | $Id_{12}$ | $Id_{22}$ | -------- |
| ⋮ | ⋮ | ⋮ | ⋮ |

APPARATUS AND METHOD FOR MOTOR CONTROL USING TABLE

BACKGROUND OF THE INVENTION

1. Field of the Invention

The present invention generally relates to a method and apparatus for controlling a motor.

2. Description of the Related Art

In work-purpose vehicles such as a battery vehicle, a motor is driven by a battery which can flow large current in a low voltage. The motor is controlled through a vector control method using a torque command current $Iq^*$ and an exciting command current $Id^*$. Normally, the torque command current $Iq^*$ and the exciting command current $Id^*$ are calculated based upon a torque command $T^*$ by use of basic equations which indicates characteristics of the motor. However, since the basic characteristics of a magnetic flux is not linear in the low-voltage/large-current motor, a torque command current $Iq^*$ and an exciting command current $Id^*$ which are obtained from the basic equations are different from a torque current Id and an exciting current Id in which the motor can be operated in the highest efficiency.

Accordingly, a method of determining a torque command currents $Iq^*$ and an exciting command currents $Id^*$ at the time when the motor can be effectively driven is demanded.

In conjunction with the above description, a method is disclosed in Japanese Laid Open Patent Application (JP-A-Heisei 6-296387), in which a lookup table is referred to convert a torque command value $T^*$ supplied from a host into an output torque estimation $T^{*\prime}$. This conventional example relates to a torque control method of an induction motor under a torque control, and a command current of the induction motor is inputted as a primary current input to a T-type equivalent circuit. An exciting current and a secondary current are calculated from a rotation frequency and a slip frequency of the induction motor to calculate the output torque estimation. A relationship between the host torque command and the output torque estimation is previously determined to each of a plurality of rotation frequencies of the induction motor. Thus, when one of the plurality of relations is selected based on a rotation frequency, a host torque command is converted into an output torque estimation by use of the selected relationship and the torque control of the induction motor is carried out based upon the determined output torque estimation.

SUMMARY OF THE INVENTION

An object of the present invention is to provide an apparatus and method for controlling motors, in which a torque command current $Iq^*$ and an exciting command current $Id^*$ are obtained to drive the motors in a higher efficiency.

In an aspect of the present invention, an apparatus of controlling a motor in a battery vehicle, includes a current command generation section having a table, and configured to generate an exciting command current and a torque command current by referring to the table based on a torque command; a converting section configured to generate 3-phase command voltages from the exciting command current and the torque command current; and a motor driving section configured to drive a motor in response to the 3-phase command voltages.

Here, the current command generation section may generate the exciting command current and the torque command current by referring to the table based on a rotation frequency for the motor in addition to the torque command. In this case, it is preferable that the table stores a relation of the exciting command current and the rotation frequency with respect to the torque command and a relation of the torque command current and the rotation frequency with respect to the torque command.

Also, the converting section includes a q-axis controller configured to generate a q-axis command voltage based on the torque command current; a d-axis controller configured to generate a d-axis command voltage based on the exciting command current; and a first converter configured to convert the q-axis command voltage and the d-axis command voltage into the 3-phase command voltages.

When the motor driving section further includes a current sensor configured to sense currents of at least 2 phases supplied to the motor, the apparatus further includes a second converter configured to generate an actual torque current and an actual exciting current from the sensed currents to output the actual torque current to the q-axis controller and the actual exciting current to the d-axis controller. The q-axis controller may generate the q-axis command voltage based on the actual torque current in addition to the torque command current, and the d-axis controller may generate the d-axis command voltage based on the actual exciting current in addition to the exciting command current.

Also, when the motor has an encoder configured to measure the rotation frequency of the motor, the apparatus further includes a phase calculation section configured to calculate a phase from the exciting command current, the torque command current, the measured rotation frequency by the encoder, and the first converter converts the q-axis command voltage and the d-axis command voltage into the 3-phase command voltages based on the phase.

Also, when the motor driving section further includes a current sensor configured to sense currents of at least 2 phases supplied to the motor, the apparatus further includes a second converter configured to generate an actual torque current and an actual exciting current from the sensed currents on the phase.

Also, the exciting command current and the torque command current are previously determined from the rotation frequency and the torque command by using an actual motor.

In another aspect of the present invention, a method of controlling a motor in a battery vehicle, is achieved by referring to a table based on a torque command to generate an exciting command current and a torque command current; by generating 3-phase command voltages from the exciting command current and the torque command current; and by driving a motor in response to the 3-phase command voltages.

Here, the referring is achieved by referring to the table based on a rotation frequency for the motor in addition to the torque command section to generate the exciting command current and the torque command current. In this case, it is preferable that the table stores a relation of the exciting command current and the rotation frequency with respect to the torque command and a relation of the torque command current and the rotation frequency with respect to the torque command.

Also, the generating 3-phase command voltages is achieved by generating a q-axis command voltage based on the torque command current; by generating a d-axis command voltage based on the exciting command current; and by converting the q-axis command voltage and the d-axis command voltage into the 3-phase command voltages.

Also, the method may be achieved by further sensing currents of at least 2 phases supplied to the motor, and by generating an actual torque current and an actual exciting current from the sensed currents. In this case, the generating a q-axis command voltage is achieved by generating the q-axis command voltage based on the actual torque current in addition to the torque command current. The generating a d-axis command voltage is achieved by generating the d-axis command voltage based on the actual exciting current in addition to the exciting command current.

Also, the method may be achieved by further measuring the rotation frequency of the motor; and calculating a phase from the exciting command current, the torque command current, and the measured rotation frequency. The converting into the 3-phase command voltages may be achieved by converting the q-axis command voltage and the d-axis command voltage into the 3-phase command voltages based on the phase.

Also, the method may be achieved by further sensing currents of at least 2 phases supplied to the motor; and generating an actual torque current and an actual exciting current from the sensed currents based on the phase.

Also, the exciting command current and the torque command current are previously determined from the rotation frequency and the torque command by using an actual motor.

Also, the method may achieved by further providing a table in advance. The providing of the table is achieved by setting a plurality of rotation frequencies; by setting a plurality of torque commands to the plurality of rotation frequencies; by previously measuring a torque current and an exciting current to each of the plurality of torque commands; and by generating the table based on the torque currents and said exciting current for the plurality of torque commands and the plurality of rotation frequencies.

BRIEF DESCRIPTION OF THE DRAWINGS

FIG. 2A is a conceptional diagram of a table which indicates a correspondence relationship of torque "T", a rotation speed "N", and a torque current "Iq";

FIG. 2B is a conceptional diagram of the table which indicates a correspondence relationship among torque "T", a rotation speed "N", and an exciting current "Id";

DESCRIPTION OF THE INVENTION

Hereinafter, a motor control apparatus of the present invention will be described in detail with reference to the attached drawings.

Figure 1:
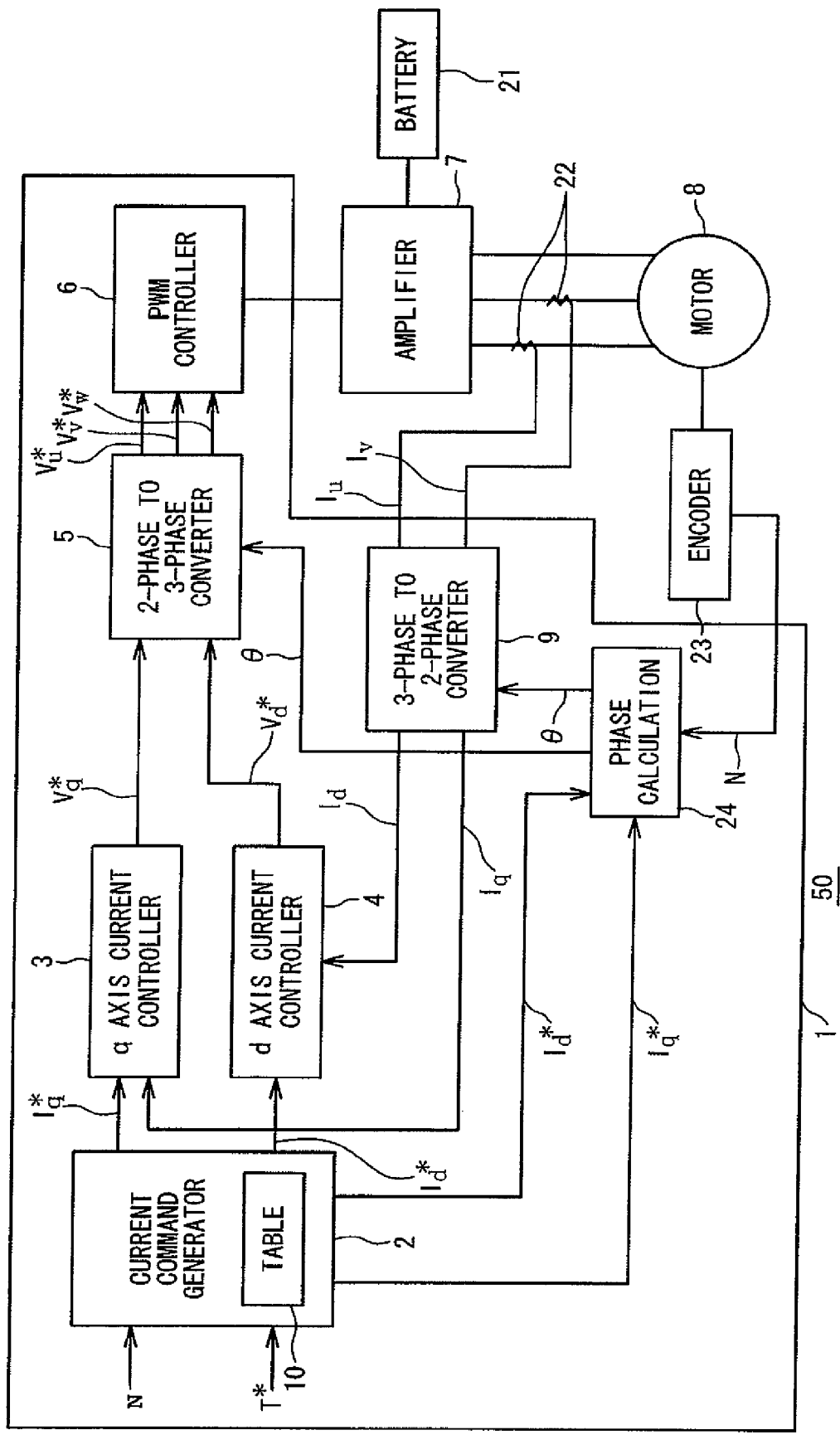
FIG. 1 is a block diagram schematically showing a configuration of a battery vehicle according to an embodiment of the present invention.

FIG. 1 is a block diagram schematically showing a configuration of a battery vehicle 50 according to an embodiment of the present invention. The battery vehicle 50 is provided with a motor control apparatus 1, an amplifier 7, a motor 8, a battery 21, a current detector 22, and an encoder 23. The motor control apparatus 1 is provided with a current command generation section 2 with a table 10, a q-axis current controller 3, a d-axis current controller 4, a 2-to-3 phase converter 5, a PWM (Pulse Width Modulation) controller 6, a phase calculation section 24, and a 3-to-2 phase converter 9. A forklift is exemplified as the above-explained battery vehicle 50.

The current command generation section 2 receives a rotation frequency N and a torque command T*, and refers to the table 10 based on the rotation frequency N and the torque command T* to generate a torque command current Iq* and an exciting command current Id*, which are respectively outputted to the q-axis current controller 3 and the d-axis current controller 4.

The q-axis current controller 3 is connected to the current command generation section 2. The q-axis current controller 3 receives a torque command current Iq* from the current command generation section 2, and an actual torque current value Iq which is fed back from the 3-to-2 phase converter 9. Thus, the q-axis current controller 3 generates a q-axis command voltage Vq* based upon the torque command current Iq* and the actual torque current Iq, and outputs the generated q-axis command voltage Vq* to the 2-to-3 phase converter 5.

The d-axis current controller 4 is connected to the current command generation section 2. The d-axis current controller 4 receives the exciting command current Id* from the current command generation section 2 and an actual exciting current value Id fed back from the 3-to-2 phase converter 9, and generates a d-axis command voltage Vd based upon the exciting command current Id* and the actual exciting current value Id. The d-axis command voltage Vd* is outputted to the 2-to-3 phase converter 5.

The 2-to-3 phase converter 5 is connected to the q-axis current controller 3 and the d-axis current controller 4. The 2-to-3 phase converter 5 converts the q-axis command voltage Vq* and the d-axis command voltage Vd* into 3-phase command voltages Vu*, Vv*, and Vw*, which are outputted to the PWM controller 6.

The PWM controller 6 is connected to the 2-to-3 phase converter 5. The PWM controller 6 controls the amplifier 7 based upon the 3-phase command voltages Vu*, Vv*, Vw*.

The amplifier 7 is connected to a battery 21. The amplifier 7 flows drive current from the battery to the motor 8 based on the 3-phase command voltages Vu*, Vv*, Vw to drive the motor 8. Thus, the motor 8 generates a torque, and drives the motor 8 to move the battery vehicle 1. The amplifier 7 is such as an inverter. The motor 8 has the encoder 23. The encoder 23 encodes the rotation frequency of the motor 8 and outputs the rotation frequency N to the phase calculation section 24. The motor 8 is such as an IM (induction motor).

The phase calculation section 24 generates a phase θ based upon the rotation frequency N supplied from the encoder 23, and the torque command current Iq* and the exciting command current Id* supplied from the current command generation section 2. The phase calculation section 24 outputs the phase θ to the 2-to-3 phase converter 5 and the 3-to-2 phase converter 9.

The 3-to-2 phase converter 9 converts the currents Iu and Iv supplied from the amplifier to the motor 8 and detected by the current detector 22, and a current Iw calculated from the detected currents Iu and Iv into the actual torque current Iq and the actual exciting current Id based on the phase θ. The actual torque current Iq and the actual exciting current Id are outputted to the q-axis current controller 3 and the d-axis current controller 4, respectively.

The table 10 is previously stored in a storage section (not shown) provided in the current command generation section 2. The table 10 shows a relationship of the rotation frequency N, the torque T, and the torque command current Iq*, as shown in FIG. 2A and another relationship of the rotation frequency N, the torque T, and the exciting command current Id* as shown in FIG. 2B.

Next, a method for providing the table 10 will now be described in detail.

Figure 5:
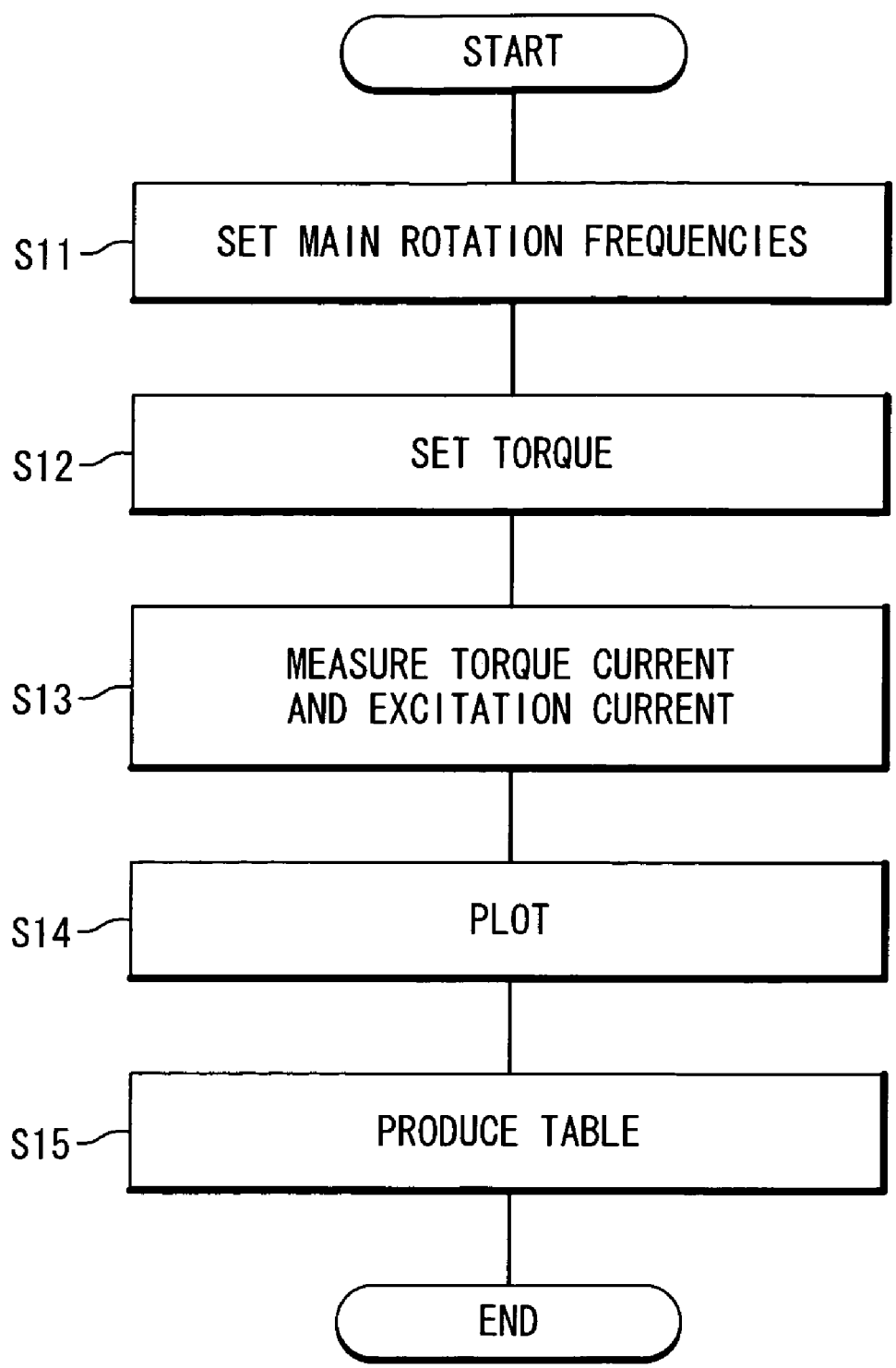
FIG. 5 is a flow chart showing a table providing step of the motor control method.

FIG. 5 is a flow chart showing a table providing process. First, a plurality of rotation frequencies are set (step S11). Subsequently, a plurality of torques are set to each of the rotation frequencies (step S12). Subsequently, an exciting current and a torque current are measured for each of the rotation frequencies such that the motor 8 generates the torque with the minimum power consumption. In this measurement, an actual motor is used. Also, the torque current values and the exciting current of the actual motor may be measured by using measuring devices which are known in the technical field. When the above measurement is carried out, it is preferable to consider the voltage drop of the battery on the supply of a motor current.

Figure 3A:
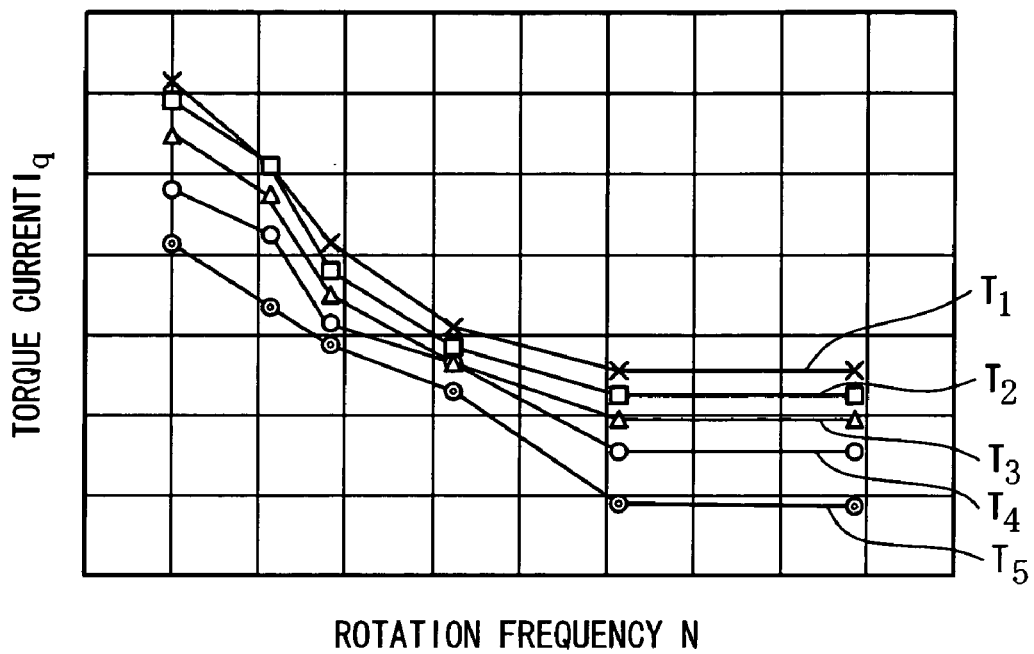
FIG. 3A is a graphic representation which indicates a correspondence relationship of torque "T", a rotation speed "N", and a torque current "Iq"

Next, the rotation frequency, the torque, and the measured torque current are plotted to establish a relationship among these parameters. Similarly, a rotation frequency, the torque, and the measured exciting current are plotted to establish another relationship among these parameters. Data between the measured data are obtained through a linear interpolation. A data in a rotation frequency which is higher than the measured rotation frequencies is determined to be same as the measured data in the largest rotation frequency (step S14). In this way, a graphic representation of FIG. 3A is provided to show the relationship of the rotation frequency and the torque current with respect to the torques. Also, another graphic representation of FIG. 3B is provided to show the relationship of the rotation frequency and the exciting current with respect to the torques.

Figure 3B:
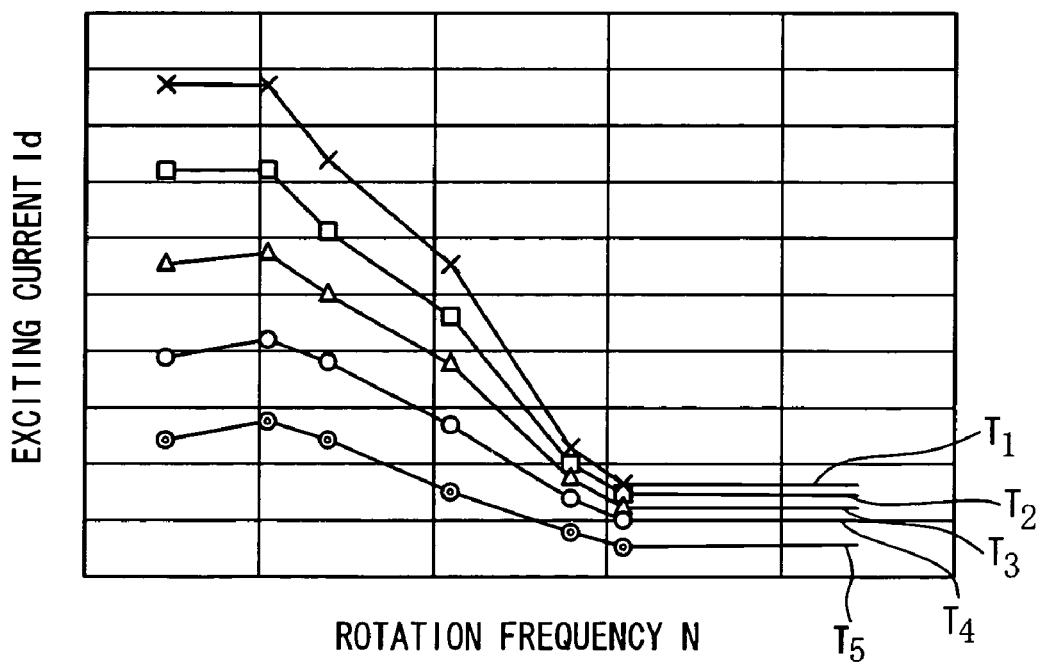
FIG. 3B is a graphic representation which indicates a correspondence relationship of torque "T", a rotation speed "N", and an exciting current "Id"

Next, a table 10 is provided based upon both of the graphic representation shown in FIG. 3A and the graphic representation shown in FIG. 3B. The table 10 is stored in the storage unit provided in the current command generation section 2.

Figure 4:
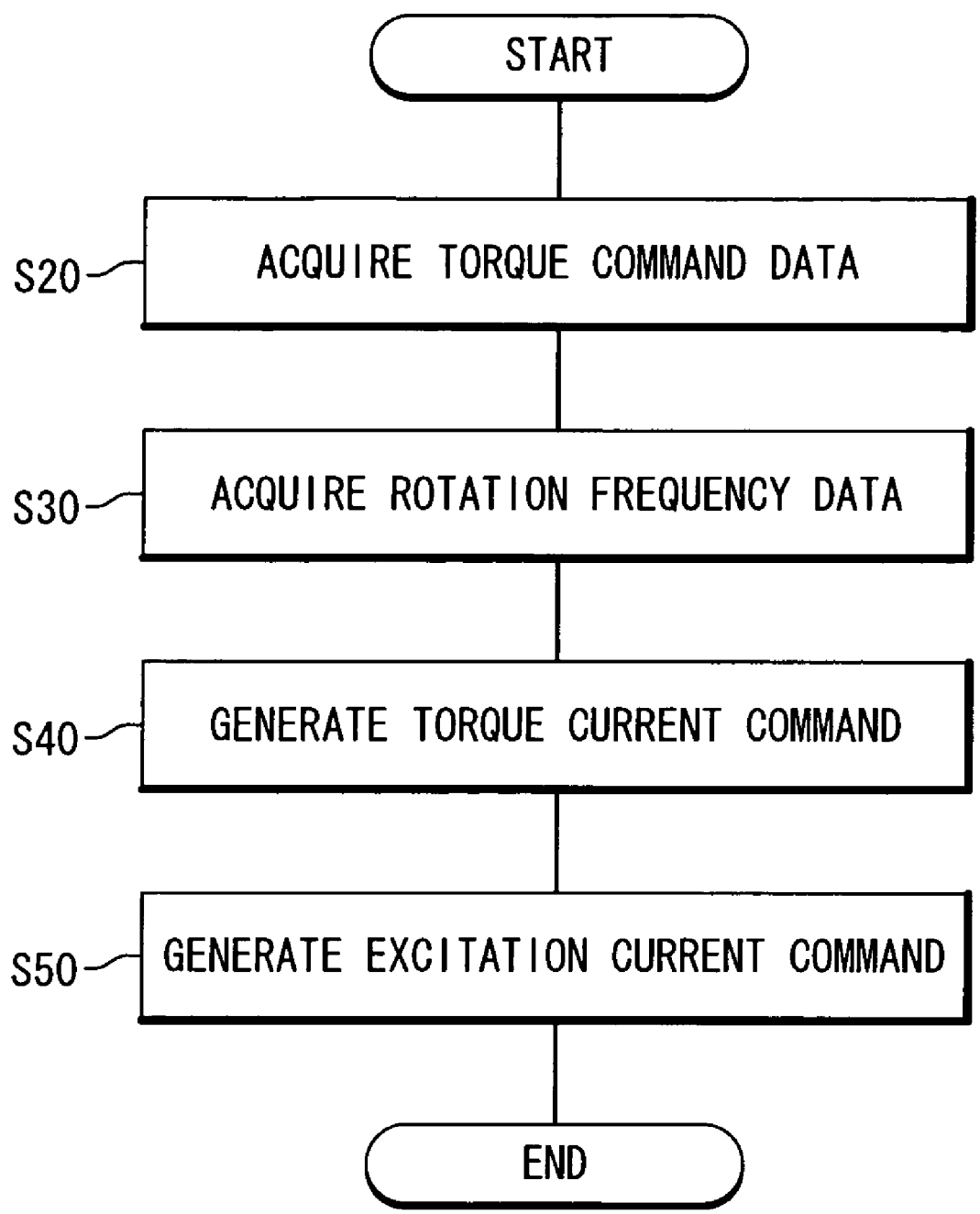
FIG. 4 is a flow chart showing a motor control method for the battery vehicle according to the embodiment of the present invention.

Next, the motor control method will be described. FIG. 4 is a flow chart showing the motor control method for the battery vehicle according to the embodiment of the present invention. The motor control method according to the embodiment of the present invention is provided with: a step (S20) for receiving a torque command T* by the current command generation section 2; a step (S30) for receiving a rotation frequency by the current command generation section 2; a torque command current generating step (S40) for referring to the table 10 based upon the torque command T* and the acquired rotation frequency N by the current command generation section 2 to generate a torque command current Iq*; and an exciting command current generating step (S50) for referring to the table 10 based upon the torque command T* and the acquired rotation frequency N by the current command generation section 2 to generate an exciting command current Id*. The above steps S20, S30, S40, and S50 will now be described in detail.

Acquisition of torque command data (Step S20):

First, the current command generation section 2 receives and acquires the torque command T*.

Acquisition of rotation speed data (Step S30):

Subsequently, the current command generation section 2 receives and acquires the rotation frequency N.

Generation of the torque command current (Step S40):

Next, the current command generation section 2 refers to the table 10 to generate the torque command current Iq* based upon the acquired torque command T* and the acquired rotation frequency N. In this case, interpolation or extrapolation is carried out by using preceding and succeeding torques with respect to the torque command T*, and also preceding and succeeding rotation frequencies with respect to the rotation frequency N.

Generation of exciting command current (Step S50):

Similarly, the current command generation section 2 refers to the table 10 to generate the exciting command current Id* based upon the acquired torque command T* and the acquired rotation frequency N. In this case, interpolation or extrapolation is carried out by using preceding and succeeding torques with respect to the torque command T*, and also preceding and succeeding rotation frequencies with respect to the rotation frequency N.

The current command generation section 2 outputs the generated torque command current Iq* to the q-axis current controller 3, and the generated exciting command current Id* to the d-axis current controller 4. The q-axis current controller 3 generates the q-axis command voltage Vq* based upon the torque command current Iq* and the actual torque current value Iq which is fed back, and outputs the generated q-axis command voltage Vq* to the 2-to-3 phase converter 5. The d-axis current controller 4 generates the d-axis command voltage Vd* based upon the exciting command current Id* and the actual exciting current value Id which is fed back, and outputs the generated d-axis command voltage Vd* to the 2-to-3 phase converter 5. Subsequently, the 2-to-3 phase converter 5 generates and outputs 3-phase command voltages Vu*, Vv*, Vw* to the PWM controller 6 based on the q-axis command voltage Vq* and the d-axis command voltage Vd*. Furthermore, the PWM controller 6 controls the amplifier 7 based upon the 3-phase command voltages Vu*, Vv*, Vw* such that 3-phase voltage is applied to the motor 8. Thus, the 3-phase voltages are applied to the motor 8 and a motor current flows. As a result, the motor 8 is driven to generate a torque. It should be noted that the currents Iu and Iv are measured by the current detector 22, and the measured current values are outputted to the 3-to-2 phase converter 9. The 3-to-2 phase converter 9 converts 3-phase currents of these currents Iu and Iv, and the current Iw which is calculated from the currents Iu and Iv, into 2-phase currents Id and Iq, which are respectively fed back to the q-axis current controller 3 and the d-axis current controller 4.

As described above, according to the present invention, the torque current and the exciting current are measured by using the motor such that the motor 8 generates the torque and the power consumption becomes lower. Then, the table is generated by using these measured current data. Based upon this table, the torque of the motor 8 can be controlled in the higher efficiency.

What is claimed is

1. An apparatus of controlling a motor in a battery vehicle, comprising:
   a current command generation section having a table, and configured to generate an exciting command current and a torque command current by referring to said table based on a torque command and a rotation frequency, at least one of the exciting command current and the torque command current being obtained by interpolation or extrapolation that uses at least one of preceding and succeeding torque commands and preceding and succeeding rotation frequencies;
   a converting section configured to generate 3-phase command voltages from said exciting command current and said torque command current; and a motor driving section configured to drive a motor in response to said 3-phase command voltages, wherein the table stores such a relationship between the rotation frequency and the exciting command current and between the rotation frequency and the torque command current that the motor generates torque with a minimum power consumption.

2. The apparatus according to claim 1, wherein said table stores a relation of said exciting current and said rotation frequency with respect to said torque command and a relation of said torque command current and said rotation frequency with respect to said torque command.

3. The apparatus according to claim 1, wherein said converting section comprises:

a q-axis controller configured to generate a q-axis command voltage based on said torque command current;

a d-axis controller configured to generate a d-axis command voltage based on said exciting command current; and a first converter configured to convert said q-axis command voltage and said d-axis command voltage into said 3-phase command voltages.

4. The apparatus according to claim 3, wherein said motor driving section further comprises:

a current sensor configured to sense currents of at least 2 phases supplied to said motor, said apparatus further comprises:

a second converter configured to generate an actual torque current and an actual exciting current from said sensed currents to output said actual torque current to said q-axis controller and said actual exciting current to said d-axis controller, said q-axis controller generates said q-axis command voltage based on said actual torque current in addition to said torque command current, and said d-axis controller generates said d-axis command voltage based on said actual exciting current in addition to said exciting command current.

5. The apparatus according to claim 3, wherein said motor has an encoder configured to measure said rotation frequency of said motor, said apparatus further comprises:

a phase calculation section configured to calculate a phase from said exciting command current, said torque command current, the measured rotation frequency by said encoder, and said first converter converts said q-axis command voltage and said d-axis command voltage into said 3-phase command voltages based on said phase.

6. The apparatus according to claim 5, wherein said motor driving section further comprises:

a current sensor configured to sense currents of at least 2 phases supplied to said motor, said apparatus further comprises:

a second converter configured to generate an actual torque current and an actual exciting current from said sensed currents on said phase.

7. The apparatus according to claim 2, wherein said exciting command current and said torque command current are previously determined from said rotation frequency and said torque command by using an actual motor.

8. A method of controlling a motor in a battery vehicle, comprising:

preparing a table that stores a relationship between a rotation frequency and an exciting command current and between the rotation frequency and a torque command current such that the motor generates torque with a minimum power consumption;

referring to the table based on a torque command and a rotation frequency command to generate the exciting command current and the torque command current, at least one of the exciting command current and the torque command current being obtained by interpolation or extrapolation that uses at least one of preceding and succeeding torque commands and preceding and succeeding rotation frequencies;

generating 3-phase command voltages from said exciting command current and said torque command current; and driving a motor in response to said 3-phase command voltages.

9. The method according to claim 8, wherein said table stores a relation of said exciting command current and said rotation frequency with respect to said torque command and a relation of said torque command current and said rotation frequency with respect to said torque command.

10. The method according to claim 8, wherein said generating 3-phase command voltages comprises:

generating a q-axis command voltage based on said torque command current;

generating a d-axis command voltage based on said exciting command current; and converting said q-axis command voltage and said d-axis command voltage into said 3-phase command voltages.

11. The method according to claim 10, further comprising:

sensing currents of at least 2 phases supplied to said motor; and generating an actual torque current and an actual exciting current from said sensed currents, said generating a q-axis command voltage comprises:

generating said q-axis command voltage based on said actual torque current in addition to said torque command current, and said generating a d-axis command voltage comprises:

generating said d-axis command voltage based on said actual exciting current in addition to said exciting command current.

12. The method according to claim 9, further comprising:

measuring said rotation frequency of said motor; and calculating a phase from said exciting command current, said torque command current, the measured rotation frequency, wherein said converting into said 3-phase command voltages comprises:

converting said q-axis command voltage and said d-axis command voltage into said 3-phase command voltages based on said phase.

13. The method according to claim 12, further comprising:

sensing currents of at least 2 phases supplied to said motor; and generating an actual torque current and an actual exciting current from said sensed currents based on said phase.

14. The method according to claim 9, wherein said exciting command current and said torque command current are previously determined from said rotation frequency and said torque command by using an actual motor.

15. The method according to claim 8, further comprising:
a providing a table in advance,
wherein said providing comprises:
setting a plurality of rotation frequencies;
setting a plurality of torque commands to said plurality of rotation frequencies;
previously measuring a torque current and an exciting current to each of said plurality of torque commands; and
generating said table based on said torque current and said exciting current for said plurality of torque commands and said plurality of rotation frequencies.

* * * * *